(12) United States Patent
Takayama

(10) Patent No.: US 11,503,214 B2
(45) Date of Patent: Nov. 15, 2022

(54) IMAGE CAPTURING CONTROL APPARATUS, IMAGE CAPTURING CONTROL METHOD, AND NON-TRANSITORY COMPUTER-READABLE STORAGE MEDIUM

(71) Applicant: CANON KABUSHIKI KAISHA, Tokyo (JP)

(72) Inventor: Tomohiko Takayama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/501,106

(22) Filed: Oct. 14, 2021

(65) Prior Publication Data

US 2022/0132041 A1 Apr. 28, 2022

(30) Foreign Application Priority Data

Oct. 27, 2020 (JP) .............................. JP2020-179981

(51) Int. Cl.
*H04N 5/247* (2006.01)
*H04N 5/232* (2006.01)

(52) U.S. Cl.
CPC ... *H04N 5/23299* (2018.08); *H04N 5/232933* (2018.08); *H04N 5/247* (2013.01)

(58) Field of Classification Search
CPC ......... H04N 5/23299; H04N 5/232933; H04N 5/247
See application file for complete search history.

(56) References Cited

U.S. PATENT DOCUMENTS

2016/0286134 A1* 9/2016 Ardö ...................... H04N 5/247
2017/0347019 A1* 11/2017 Ito ............................ G02B 7/28
2018/0376078 A1* 12/2018 Adachi .............. H04N 5/23296

FOREIGN PATENT DOCUMENTS

JP 2015-119476 A 6/2015

* cited by examiner

*Primary Examiner* — Mekonnen D Dagnew
(74) *Attorney, Agent, or Firm* — Cowan, Liebowitz & Latman, P.C.

(57) ABSTRACT

There is provided with an image capturing control apparatus. A setting unit is configured to set an arrangement of a plurality of image capturing units. The setting unit performs a first setting operation of deciding a relative arrangement of the plurality of image capturing units in accordance with a setting selected from a plurality of settings respectively defining the relative arrangement between the plurality of image capturing units and a second setting operation of deciding the arrangement of the plurality of image capturing units by rotating the plurality of image capturing units while maintaining the relative arrangement between the plurality of image capturing units decided by the first setting operation. A control unit is configured to control the arrangement of the plurality of image capturing units in accordance with a setting.

19 Claims, 12 Drawing Sheets

F I G. 3A
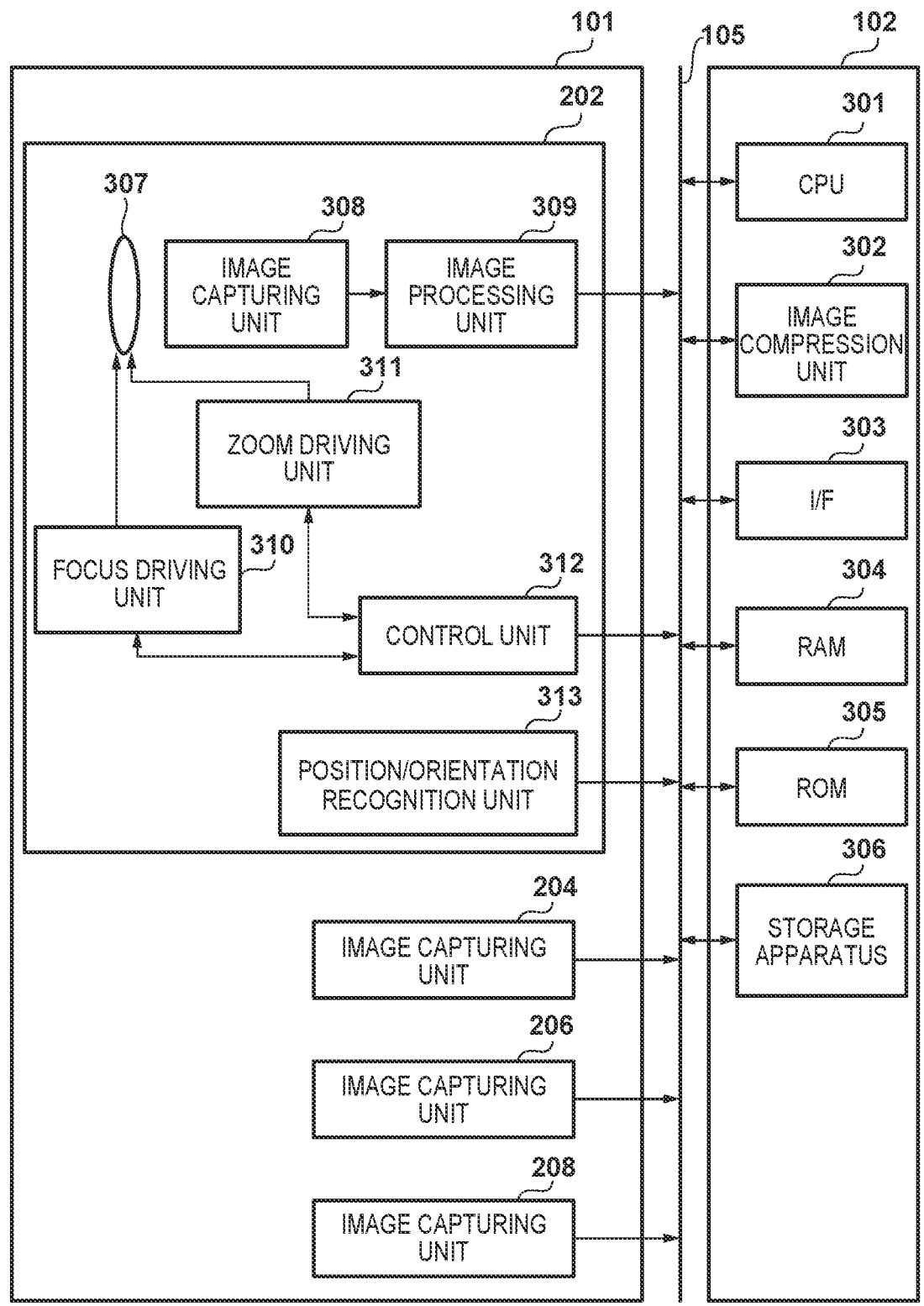

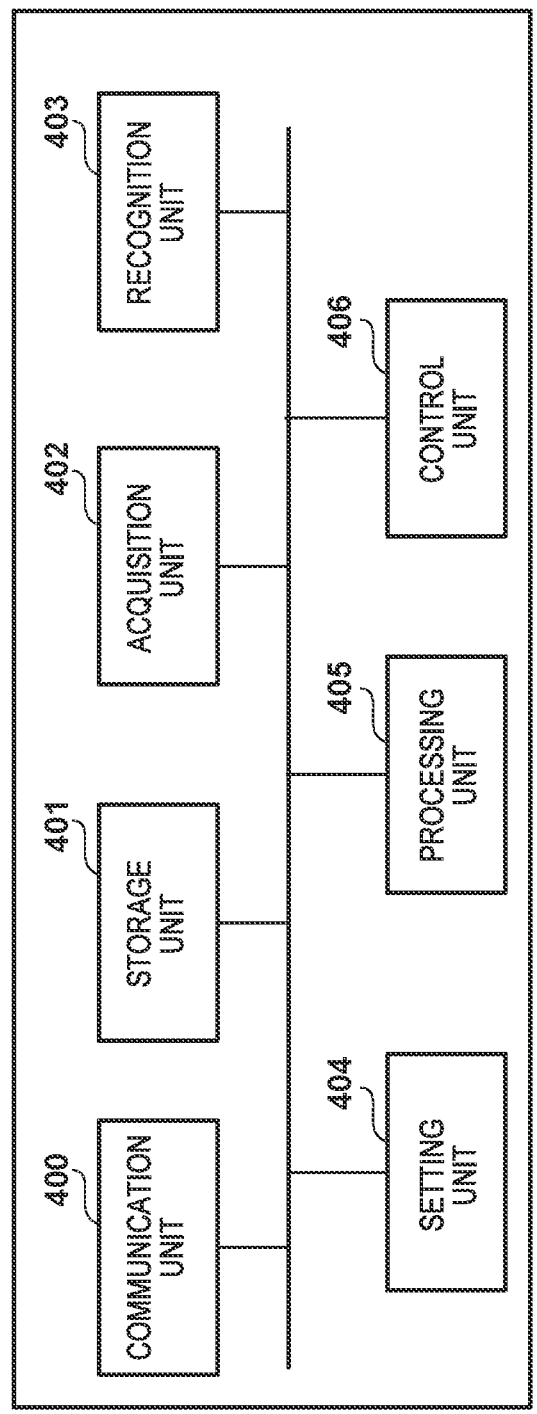

IMAGE CAPTURING CONTROL APPARATUS, IMAGE CAPTURING CONTROL METHOD, AND NON-TRANSITORY COMPUTER-READABLE STORAGE MEDIUM

BACKGROUND OF THE INVENTION

Field of the Invention

The present invention relates to an image capturing control apparatus, an image capturing control method, and a non-transitory computer-readable storage medium.

Description of the Related Art

There are multi-lens image capturing apparatuses that are capable of shooting a wide range by a plurality of image capturing units arranged in a circular shape on the image capturing apparatuses. The plurality of image capturing units are arranged, fixed to the multi-lens image capturing apparatuses. However, if there are obstacles such as walls and columns in the vicinity of the installation locations of the multi-lens image capturing apparatuses, they may block the image shooting ranges of the plurality of image capturing units. Therefore, a mechanism for mounting a multi-lens image capturing apparatus that can freely change the positions and orientations of image capturing units such that the image shooting ranges of the image capturing units can be changed has been disclosed (Japanese Patent Laid-Open No. 2015-119476). In addition, there has been proposed a multi-lens image capturing apparatus having a function (multi-lens preset function) of uniquely setting the arrangement of a plurality of image capturing units.

SUMMARY OF THE INVENTION

The present invention in its one aspect provides an image capturing control apparatus comprising a setting unit configured to set an arrangement of a plurality of image capturing units, wherein the setting unit performs a first setting operation of deciding a relative arrangement of the plurality of image capturing units in accordance with a setting selected from a plurality of settings respectively defining relative arrangements between the plurality of image capturing units and a second setting operation of deciding the arrangement of the plurality of image capturing units by rotating the plurality of image capturing units while maintaining the relative arrangement between the plurality of image capturing units decided by the first setting operation, and a control unit configured to control the arrangement of the plurality of image capturing units in accordance with a setting by the setting unit.

The present invention in its one aspect provides an image capturing control method comprising setting an arrangement of a plurality of image capturing units, wherein the setting includes a first setting operation of deciding a relative arrangement of the plurality of image capturing units in accordance with a setting selected from a plurality of settings respectively defining relative arrangement between the plurality of image capturing units, and a second setting operation of deciding the arrangement of the plurality of image capturing units by rotating the plurality of image capturing units while maintaining the relative arrangement between the plurality of image capturing units decided by the first setting operation, and controlling the arrangement of the plurality of image capturing units in accordance with a setting by the setting.

The present invention in its one aspect provides a non-transitory computer-readable storage medium storing a program that, when executed by a computer, causes the computer to perform a method comprising setting an arrangement of a plurality of image capturing units, wherein the setting includes a first setting operation of deciding a relative arrangement of the plurality of image capturing units in accordance with a setting selected from a plurality of settings respectively defining relative arrangement between the plurality of image capturing units, and a second setting operation of deciding the arrangement of the plurality of image capturing units by rotating the plurality of image capturing units while maintaining the relative arrangement between the plurality of image capturing units decided by the first setting operation, and a controlling the arrangement of the plurality of image capturing units in accordance with a setting by the setting.

Further features of the present invention will become apparent from the following description of exemplary embodiments with reference to the attached drawings.

BRIEF DESCRIPTION OF THE DRAWINGS

FIG. 3A is a functional block diagram of the image capturing apparatus and an information processing apparatus.

FIG. 3B is a functional block diagram of the information processing apparatus.

DESCRIPTION OF THE EMBODIMENTS

Figure 1:
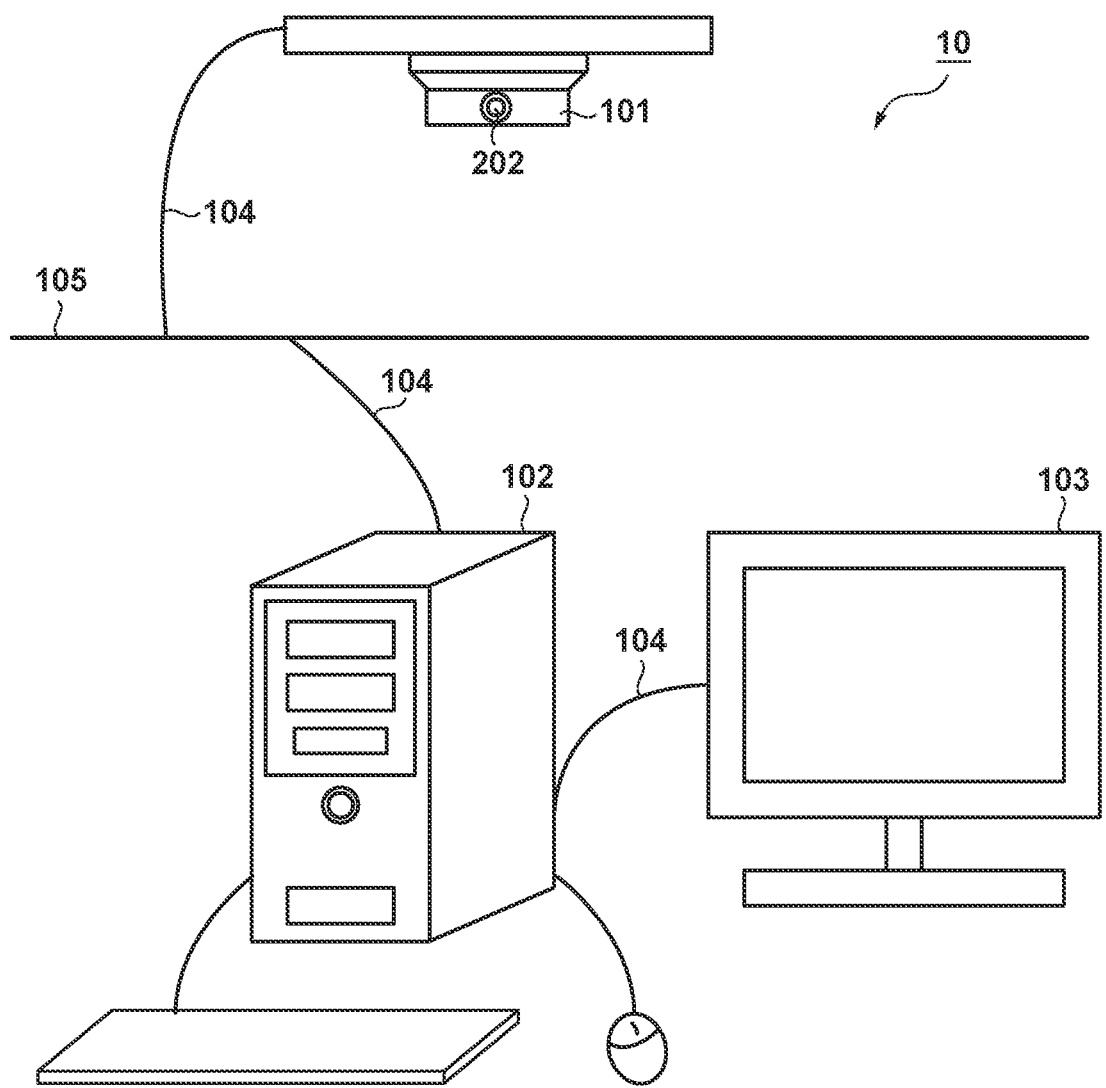
FIG. 1 is an overall view of a configuration of apparatuses in an image capturing system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

An exemplary embodiment of the present invention improves work efficiency related to an adjustment of an image shooting range of an image capturing apparatus having a plurality of image capturing units.

In an embodiment described below, a network camera is used as an image capturing apparatus 101, but the present invention is not limited thereto and does not exclude the use of other image capturing devices (such as a video camera, a still camera, a mobile phone, and a personal digital assistant). Further, an image capturing system 10 including the image capturing apparatus 101 and other apparatuses is described below, and here an information processing apparatus 102 is used as an image capturing control apparatus that performs control of the image capturing apparatus 101.

The other apparatuses may have one or more functions of the information processing apparatus 102 according to an embodiment described later. For example, the image capturing apparatus 101 may have one or more functions of the information processing apparatus 102 according to each embodiment. The image capturing apparatus 101 such as a network camera may have a function of the information processing apparatus 102, which performs image capturing control. An image capturing control apparatus according to an embodiment of the present invention may be configured by a plurality of information processing apparatuses 102 connected via a network, for example. Incidentally, the image capturing control apparatus may be mounted on the image capturing apparatus 101 or a server that communicates with the image capturing apparatus 101.

Hereinafter, an example of an embodiment is illustrated in FIGS. 1 to 13, and an image capturing control apparatus will be described with reference to the drawings.

FIG. 1 is a view illustrating an example of a configuration of the image capturing system 10 according to the present embodiment. The image capturing system 10 is configured to include the image capturing apparatus 101, the information processing apparatus 102, a display apparatus 103 and a network 105. The image capturing apparatus 101 and the information processing apparatus 102 are connected by the network 105 via a cable 104, and the information processing apparatus 102 and the display apparatus 103 are connected by a cable 104.

The image capturing apparatus 101 is an apparatus that is installed outdoors in, for example, a residential area, a park, a commercial facility, or the like; is for shooting various targets; and is, for example, a surveillance camera, a network camera, or the like. The image capturing apparatus 101 has a function of shooting targets and includes a plurality of image capturing units including an image capturing unit 202 on the lower side of the main body of the apparatus, and a lighting unit (not illustrated). The plurality of image capturing units shoot a moving image at a predetermined angle of view, and transmits various kinds of data including a moving image, image capturing time, and identification information of the plurality of image capturing units, and the like to the information processing apparatus 102 via the network 105. The lighting unit is, for example, visible light and infrared light used to ensure brightness in a low-light environment such as at night. Various kind of data includes, for example, image capturing setting information such as the pan angle, tilt angle, rotation angle, zoom magnification, focus position, exposure, and white balance of the image capturing unit 202.

The information processing apparatus 102 is an apparatus for controlling the image capturing apparatus 101, and is, for example, a PC or the like having a program for executing a control function. The information processing apparatus 102 transmits the following control commands to the image capturing apparatus 101. For example, control commands such as a pan angle, tilt angle, rotation angle, zoom magnification, focus position, exposure, and white balance. The information processing apparatus 102 can transmit these control commands so as to control the position and orientation of each image capturing unit in accordance with settings when performing a first setting operation and a second setting operation, which will be described later. On the other hand, the information processing apparatus 102 may transmit setting information such as the shooting modes set in the first setting operation and the second setting operation to the image capturing apparatus 101 as a control command. In this case, the image capturing apparatus 101 may control the rotation angle or the like of each image capturing unit in accordance with the setting information. Further, the information processing apparatus 102 can control the operation of the plurality of image capturing units of the image capturing apparatus 101, and configuration may be taken so as to control the image capturing apparatus 101 by connecting the plurality of information processing apparatuses 102 to the image capturing apparatus 101.

The display apparatus 103 is an apparatus for displaying an image processing result of the information processing apparatus 102, a moving image that the image capturing apparatus 101 has shot, and the like, and is, for example, a liquid crystal display (LCD) or the like. The display apparatus 103 is connected to the information processing apparatus 102 via the cable 104, which conforms to a communication standard such as HDMI®. Note that the information processing apparatus 102 and the display apparatus 103 may be configured as a single unit, and the image capturing apparatus 101 and the information processing apparatus 102 may be configured as a single unit.

Note that an image processing result by the information processing apparatus 102, an image shot by the image capturing apparatus 101, and the like may be displayed not only on the display apparatus 103 but also on a display apparatus of another external apparatus (e.g., a server) not included in the image capturing system 10, for example. For example, an image processing result, a moving image, and the like may be displayed on a display apparatus of a portable information terminal (PDA) such as a mobile phone, a smart phone, or a tablet terminal connected via the network 105.

The cable 104 is, for example, a LAN cable such as a twisted pair cable and an optical fiber cable that conform to a communication standard such as GigabitEthernet®. Incidentally, the cable 104 is not limited to a wired LAN, may be configured by a wireless LAN, which conforms to a Wi-Fi® standard.

The network 105 is a LAN, WAN, and the like consisting of a plurality of routers, switches, cables, and the like, which conform to a communication standard such as Ethernet® or the like.

Figure 2A:
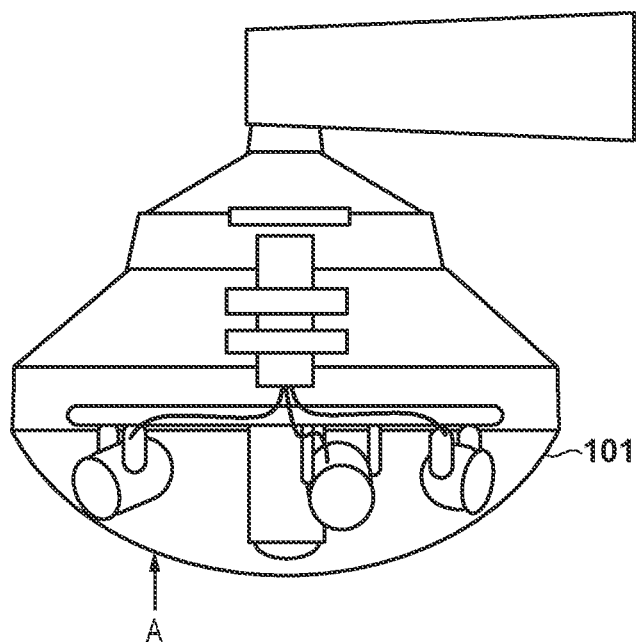
FIG. 2A is a schematic view of an image capturing apparatus.

FIG. 2A is a side view illustrating an example of a configuration of the image capturing apparatus 101 of the present embodiment. The image capturing apparatus 101 is fixed to, for example, a support structure or the like via a common axis (not illustrated) passing through the center of the image capturing apparatus 101. The lower portion of the image capturing apparatus 101 houses the plurality of image capturing units and has a protective cover (not illustrated) for protecting the plurality of image capturing units from, for example, wind, rain, and the like.

Figure 2B:
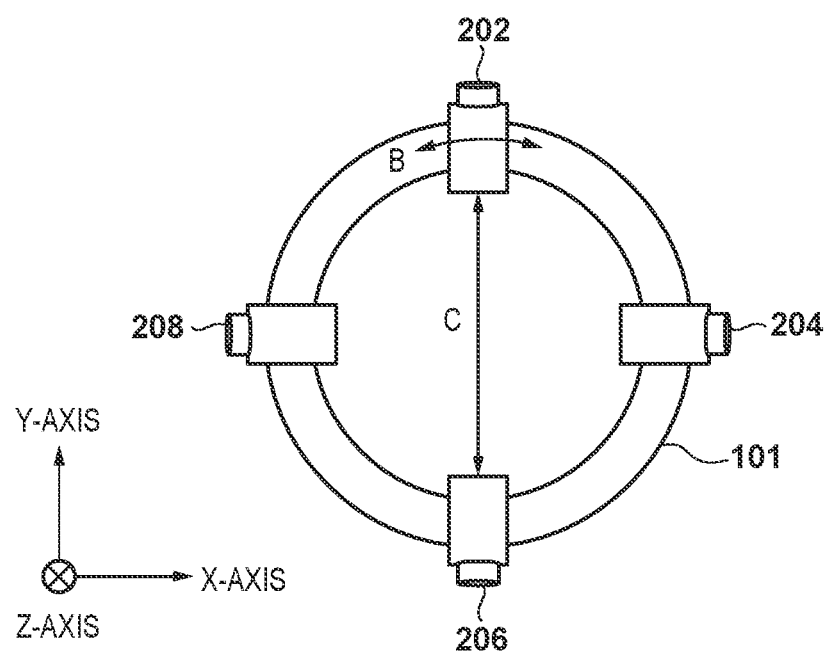
FIG. 2B is a schematic view of the image capturing apparatus.

FIG. 2B illustrates an arrangement of the plurality of image capturing units when the image capturing apparatus 101 is viewed from an arrow A in FIG. 2A. The image capturing apparatus 101 in the present embodiment has four image capturing units, but may have less than 4, or 4 or more image capturing units. The image capturing unit 202, an image capturing unit 204, an image capturing unit 206 and an image capturing unit 208 are respectively arranged on the circumference within the same circle. Note that in the arrangement of four image capturing units, all the image capturing units may be arranged in different circles, or some of the image capturing units may be arranged in the same circle and other image capturing units may be arranged in the same circle that is different from the aforementioned. Further, the plurality of image capturing units are not limited to the illustrated arrangement and can be freely arranged on the circumference of the image capturing apparatus 101 (in the direction of arrow B) and on the diameter (in the direction of arrow C).

FIG. 3A illustrates a configuration of the image capturing apparatus 101, the information processing apparatus 102, and the image capturing unit 202 for implementing the functions of this embodiment. The image capturing apparatus 101 is configured to include the image capturing unit 202, the image capturing unit 204, the image capturing unit 206 and the image capturing unit 208. The image capturing unit 202 is configured to include a lens 307, an image capturing unit 308, an image processing unit 309, a focus driving unit 310, a zoom driving unit 311 and a control unit 312. Incidentally, since the image capturing unit 204 to the image capturing unit 208 are of the same configuration as the image capturing unit 202, illustration and description of the components will be omitted. Hereinafter, a configuration of the image capturing unit 202 will be described as one example of a plurality of image capturing units.

The image capturing unit 308 is a two-dimensional image sensor for converting a two-dimensional optical image into an electric physical quantity by photoelectric conversion, and is, for example, a CCD sensor, a CMOS sensor, or the like. The image capturing unit 308 outputs captured RAW data to the image processing unit 309. The image processing unit 309 performs processing such as black-correction processing, demosaicing processing, filtering processing, and the like on the RAW data received from the image capturing unit 308, and stores the developed data in a RAM 304 via the network 105.

The control unit 312 controls the zoom driving unit 311, and zoom-in and zoom-out is realized by the zoom driving unit 311 moving a zoom lens (not illustrated) in the lens 307 along the optical axis. Similarly, the control unit 312 controls the focus driving unit 310, and a focusing operation is realized by the focus driving unit 310 moving a focus lens (not illustrated) in the lens 307 along the optical axis. The control unit 312 can control the position and orientation of the image capturing unit 202 based on control commands received from a CPU 301.

A position/orientation recognition unit 313 (position recognition unit) is a sensor for recognizing the position and orientation of the image capturing unit 202 and includes, for example, an encoder, a gyro, a GPS, an acceleration sensor, and the like. The information of the position and orientation of the image capturing unit 202 that the position/orientation recognition unit 313 has acquired is processed in the CPU 301 and is stored in the RAM 304 as information of the shooting direction and shooting angle of view of the image capturing unit 202.

The information processing apparatus 102 includes, for example, a general-purpose computer, a workstation, and the like including the CPU 301, an image compression unit 302, an I/F 303, the RAM 304, a ROM 305, and a storage apparatus 306.

The CPU 301 is an apparatus for overall control of the image capturing system 10. The CPU 301 performs control to transmit the developed data transmitted by each of the plurality of image capturing units to the image compression unit 302, and to transmit each piece of compressed developed data to the network 105. In addition, the CPU 301 can calculate the image capturing direction and image capturing angle of view of each of the plurality of image capturing units based on the position and orientation of each of the plurality of image capturing units acquired from the position/orientation recognition unit 313, and stores the information of the image capturing direction and image capturing angle of view in the RAM 304.

The image compression unit 302 performs compression processing on the developed data transmitted from the plurality of image capturing units based on the control of the CPU 301, and generates compressed data. The compressed data is outputted to another external apparatus via the display apparatus 103 or the network 105. As for compression processing of developed data, a compression method that conforms to a JPEG standard is applied to a still image, and a compression method that conforms to a standard such as MOTION-JPEG, MPEG 2, AVC/H.264, AVC/H.265, or the like is applied to a moving image.

The I/F 303 is an apparatus for performing communication with an external apparatus based on a network protocol. The I/F 303 is connected to an input apparatus such as a relay switch, an operation key including a power switch, a cross key, a joystick, a touch panel, a keyboard, and a pointing device (e.g., a mouse). The I/F 303 includes a user interface for receiving instruction information from a user or the like, and notifies the CPU 301 of the received information.

The RAM 304 is a memory for temporarily storing programs executed by the CPU 301, and is a volatile memory such as a SRAM, a DRAM, and the like. A RAM provides the CPU 301 with a work area for executing and processing programs.

The ROM 305 stores programs and data for the CPU 301 to control the image capturing system 10 and is a non-volatile memory such as an EEPROM, a flash memory, and the like. By the CPU 301 executing programs, it is possible to realize the functions of each unit according to the present embodiment to be described later.

The storage apparatus 306 is an apparatus for storing image data captured by the plurality of image capturing units, image processing-related data, and the like, and is, for example, an HDD, an SSD, an eMMC, and the like.

FIG. 3B illustrates functions that the information processing apparatus 102 of the present embodiment has. Incidentally, each function illustrated in the figure is realized by the CPU 301 executing a computer program stored in the ROM 305.

A communication unit 400 can communicate with the image capturing apparatus 101, the storage apparatus 306, and the like via the I/F 303 and the network 105. The communication unit 400 can acquire a captured image shot by a plurality of image capturing units. For example, the communication unit 400 has a function of receiving image data shot by a plurality of image capturing units and respectively transmitting a control command for controlling the plurality of image capturing units to the plurality of image capturing units. A control command is, for example, a command for the information processing apparatus 102 to cause a plurality of image capturing units to shoot an image, a command for changing the position and orientation of the plurality of image capturing units, or the like.

A storage unit 401 has information of a first setting operation and a second setting operation that a setting unit 404 to be described later has. The storage unit 401 has a function of storing image processing results and image processing-related data in the RAM 304 and the storage apparatus 306. As image processing-related data, there are, for example, a large amount of image data that indicates the characteristics of a target, and the like.

An acquisition unit 402, by combining the images that the plurality of image capturing units have shot, can acquire a whole image. A whole image refers to an image that is acquired by combining the images that a plurality of image capturing units have shot in, for example, a 360° shooting mode to be described later and in which a range larger than the image capturing range of one image capturing unit is captured. Incidentally, the shooting mode at the time of acquisition of a captured image is not limited to the 360° shooting mode, and the number of images to be combined may be a plurality. A whole image is used, for example, for recognition of a target from the whole image, for a user to select a region, and the like. Further, the acquisition unit 402, based on the respective positions and orientations of the plurality of image capturing units that the position/orientation recognition unit 313 acquires, can acquire an absolute position of a target or selected region.

A recognition unit 403 can perform object recognition processing for an image that the plurality of image capturing units have shot. The recognition unit 403 reads out image data that indicates the features of a target stored in the storage unit 401, and can recognize the target from the captured image by, for example, a method based on pattern matching. For example, when recognizing a road from a captured image, the recognition unit 403 can recognize the road stochastically by comparing the captured image with a plurality of collation patterns indicating the features of the road. The collation patterns of the road may be a plurality of collation patterns of when viewed from a viewpoint such as an oblique direction or an upward direction, for example. In addition, it is not necessary to use a collation pattern indicating a whole feature of the road, but rather a collation pattern indicating a part of the feature of the road (e.g., a branch of the road, a road sign, or the like).

The setting unit 404 can set the arrangement of the plurality of image capturing units. The setting unit 404, for example, can perform a first setting operation of deciding the arrangement of the plurality of image capturing units in accordance with a setting selected from a plurality of settings respectively defining the relative arrangement between the plurality of image capturing units. Further, the setting unit 404 can perform a second setting operation of deciding the arrangement of the plurality of image capturing units by changing the arrangement of the plurality of image capturing units while maintaining the relative arrangement between the plurality of image capturing units. Incidentally, the setting unit 404 can automatically set the arrangement of the plurality of image capturing units such that a target recognized in the object recognition processing of the recognition unit 403 is included in the shooting range.

A processing unit 405 can perform, as image processing, clipping processing for each of the captured images by, for example, a plurality of image capturing units. Incidentally, in the case of performing the above processing, the above captured image need only be an image sufficiently larger than the image after clipping. A control unit 406, in accordance with the setting by the setting unit 404, can control the arrangement of the plurality of image capturing units. The control unit 406 can manage the transfer of control rights between the image capturing apparatus 101 and the plurality of information processing apparatuses 102.

Figure 4A:
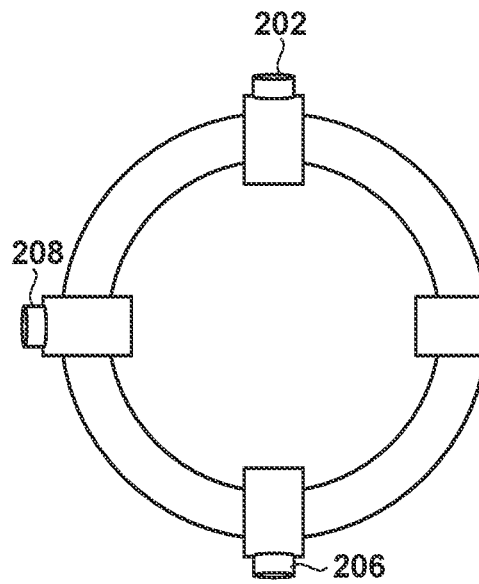
FIG. 4A is a schematic view describing an arrangement of image capturing units according to a first setting operation.
Figure 4B:
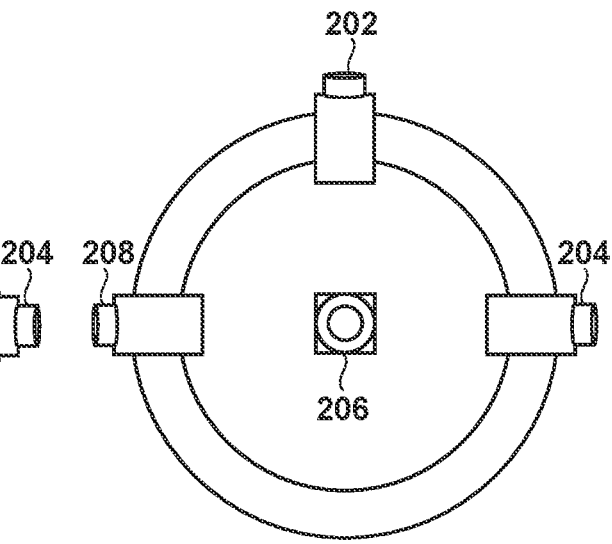
FIG. 4B is a schematic view describing an arrangement of image capturing units according to the first setting operation.
Figure 4C:
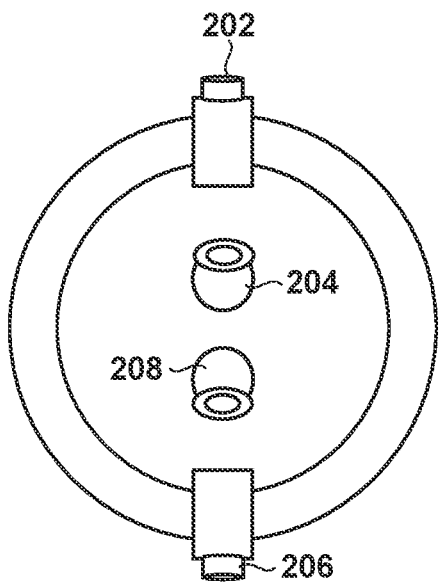
FIG. 4C is a schematic view describing an arrangement of image capturing units according to the first setting operation.

FIGS. 4A to 4C illustrate the arrangement after the first setting operation of the plurality of image capturing units that are arranged in the same circle. Note that the plurality of image capturing units does not need to be arranged within the same circle so long the range is such that shooting modes to be described below can be realized. As examples of the arrangement, there are a 360° shooting mode, which is an arrangement in which the plurality of image capturing units are capable of shooting the entire circumference of the image capturing apparatus 101, and a 270° shooting mode, which is an arrangement in which only a portion of the entire circumference of the image capturing apparatus 101 and directly below the image capturing apparatus 101 can be shot. Further, there is a line shooting mode, which is an arrangement in which the vectors of the respective image capturing directions of the plurality of image capturing units whose origin is the image capturing apparatus 101 are in the same plane. The user can set the arrangement of the plurality of image capturing units by a remote operation by inputting any one setting of the first setting operation to the setting unit 404 via the I/F 303. Hereinafter, each of the illustrated shooting modes will be described.

FIG. 4A is an arrangement of the plurality of image capturing units in the 360° shooting mode and is used, for example, when shooting a large space without partitions. By the plurality of image capturing units being respectively arranged shifted by 90°, the plurality of image capturing units can shoot the entire, 360° circumference of the image capturing apparatus 101.

FIG. 4B is an arrangement of the plurality of image capturing units in the 270° shooting mode and is used, for example, when shooting an intersection, which has bends in the roads. In the 270° shooting mode, the image capturing unit 206 can shoot directly below the image capturing apparatus 101 and the other image capturing units can shoot a range of a 270° circumference of the image capturing apparatus 101, respectively. Thus, the plurality of image capturing units can shoot only a portion of the entire circumference of the image capturing apparatus 101 and directly below the image capturing apparatus 101.

FIG. 4C is an arrangement of the plurality of image capturing units in the line shooting mode and is used, for example, when shooting a target is arranged in a straight line. Each of the plurality of image capturing units are arranged in a straight line, and further the image capturing directions of the plurality of image capturing units are set to different directions (or vectors of the image capturing directions) respectively. The image capturing directions of the plurality of image capturing units (or vectors of the image capturing directions) are represented by tilt angles indicating the tilt in the orientations of the image capturing units. For example, with the image capturing direction immediately below the image capturing apparatus 101 as a 0° tilt, and the image capturing unit 202 may be set to a +90° tilt, the image capturing unit 204 may be set to a +30° tilt, the image capturing unit 206 may be set to a −30° tilt, and the image capturing unit 208 may be set to a −90° tilt. Thus, the plurality of image capturing units can shoot a target arranged on a straight line from various angles. Incidentally, the shooting modes in the present embodiment are not limited to the above.

Figure 5A:
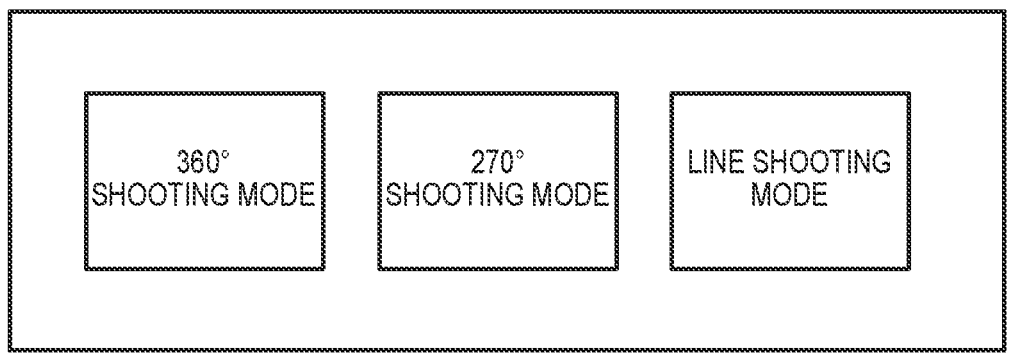
FIG. 5A is a schematic view describing a user interface of the first setting operation.

Next, the I/F 303 has a user interface including a first setting unit for accepting a selection from a plurality of settings for the first setting operation, and a second setting unit for accepting an instruction to change the arrangement of the plurality of image capturing units for the second setting operation. FIG. 5A is a schematic view describing a user interface of the first setting operation. In the user interface, rectangular buttons for selecting the first setting operation including the 360° shooting mode, the 270° shooting mode, and the line shooting mode are arranged on a screen. By the information of which of the above buttons the user has pressed being transmitted to the setting unit 404, the first setting operation becomes active. In accordance with the active first setting operation, the setting unit 404 can set the arrangement of the plurality of image capturing units.

Figure 5B:
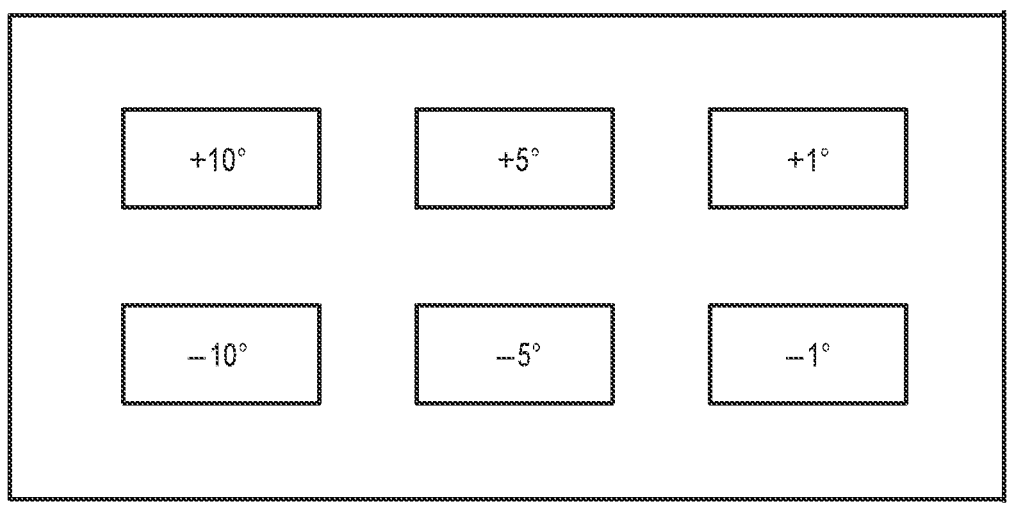
FIG. 5B is a schematic view describing a user interface of the second setting operation.

FIG. 5B is a schematic view describing a user interface of the second setting operation. The second setting operation can rotate the plurality of image capturing units by the same angle with respect to the common axis or the center of the circle that the image capturing apparatus 101 comprises. In the user interface of FIG. 5B, buttons for the second setting operation are arranged on the screen, including +1°, +5°, +10°, −1°, −5° and −10°. Incidentally, with the Z-axis of FIG. 2B as the reference, the above + and − indicate settings of a clockwise direction and a counterclockwise direction, respectively. The second setting operation, while maintaining the relative arrangement between the plurality of image capturing units set in the first setting operation, by changing the arrangement of the plurality of image capturing units by any of the angles illustrated above, for example, can decide the arrangement of the plurality of image capturing units. For example, when rotating the relative arrangement between the plurality of image capturing units +10° clockwise, by the user pressing the +10° button once, the relative arrangement of the plurality of image capturing units is changed to the arrangement rotated by +10°. Incidentally, although a button for changing the tilt angle of the plurality of image capturing units is not illustrated in the user interface the same figure, a button for changing the tilt angle may be further provided, or a user interface for setting the tilt angle may be separately provided.

Figure 6A:
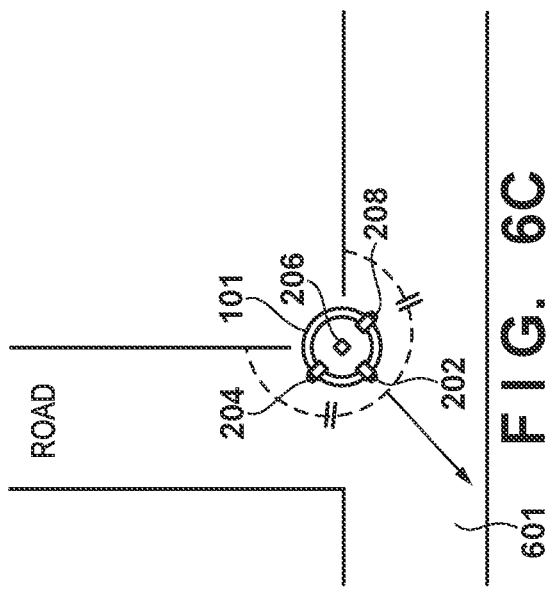
FIG. 6A is a schematic view describing the first setting operation and the second setting operation.

As a specific example of shooting, a case where the image capturing apparatus 101 is installed, for example, on the inner side of the bend of the road, and the relative arrangement between the plurality of image capturing units is set so as to be capable of shooting a part of the shooting range of the entire circumference of the image capturing apparatus 101 will be described below. FIG. 6A is a schematic view for describing the first and second setting operations when the image capturing apparatus 101 is installed on the inner side (upper right portion of the same figure) of the bend of a three-way intersection. The three-way intersection has a road extending in the upper direction of the figure (first direction) and roads extending in the left/right direction (second direction) from the bend with respect to the installation position of the image capturing apparatus 101. The image capturing apparatus 101, in order to shoot the first direction and the second direction, sets the 270° shooting mode in the first setting operation.

Figure 7A:
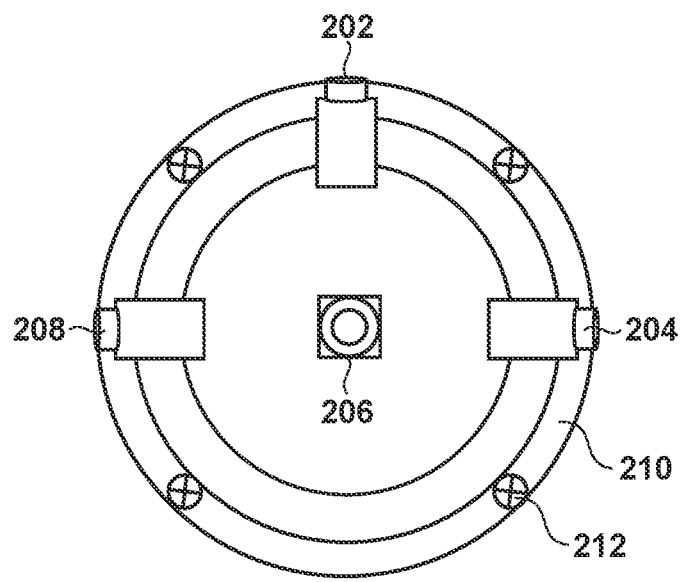
FIG. 7A is a schematic view describing an operation of image capturing units according to the second setting operation.

Here, FIG. 7A illustrates the arrangement of the plurality of image capturing units of the 270° shooting mode and a mounting mechanism. An exterior 210 is an external component of the image capturing apparatus 101 and has a function of a fixing member for causing the image capturing apparatus 101 to hold the plurality of image capturing units. A fixing unit 212 is, for example, a screw or the like for fixing the image capturing apparatus 101 and the exterior 210, and is provided at four locations on the circumference of the exterior 210. Incidentally, the positions of the exterior 210 and the fixing unit 212 on the image capturing apparatus 101 are not changed by the first setting operation and the second setting operation. On the other hand, the positions of the plurality of image capturing units are respectively decided by the fixing position of the exterior 210 with respect to the image capturing apparatus 101. The decided positions of the plurality of image capturing units decide the image capturing direction of each of the plurality of image capturing units.

Figure 6C:
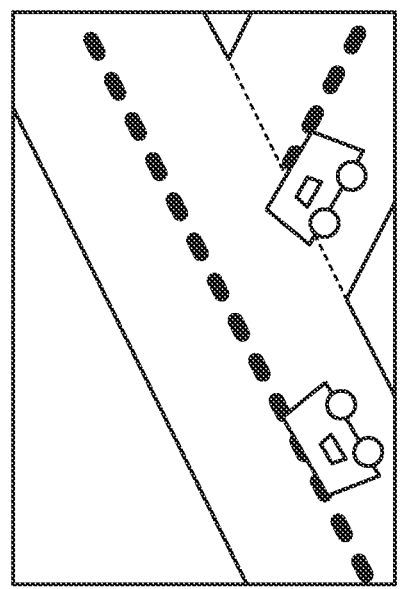
FIG. 6C is a schematic view describing the first setting operation and the second setting operation.
Figure 6B:
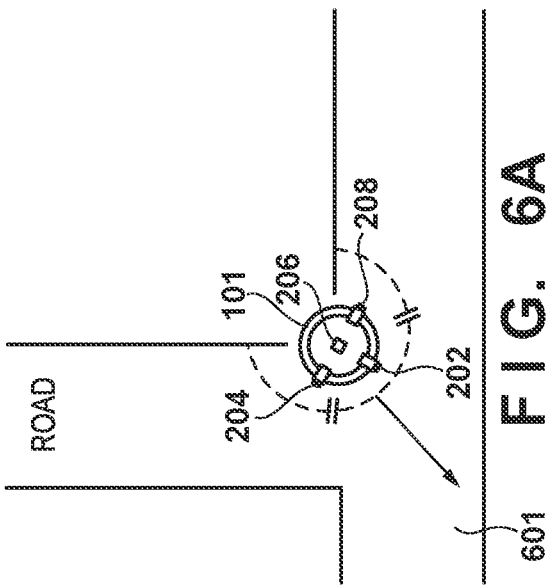
FIG. 6B is a schematic view describing the first setting operation and the second setting operation.

Returning to description, FIG. 6B is an image in which the image capturing unit 202 of FIG. 6A has shot a road in the second direction. FIG. 6B also indicates that the shooting range of the captured image is misaligned in the counterclockwise direction from the shooting range of that the user desires to shoot. At this time, conventionally, the user would manually perform an arrangement change of the arrangement of the plurality of image capturing units so as to align with the shooting range that the user desires to shoot. A manual arrangement change refers to, for example, a work of the user changing the mounting position of the exterior 210 with respect to the image capturing apparatus 101. In the present embodiment, in order to improve work efficiency related to the change of the arrangement of the plurality of image capturing units, the arrangement of the plurality of image capturing units can be changed by remote control via a mobile terminal that the user has, the network 105, and the like.

Figure 7B:
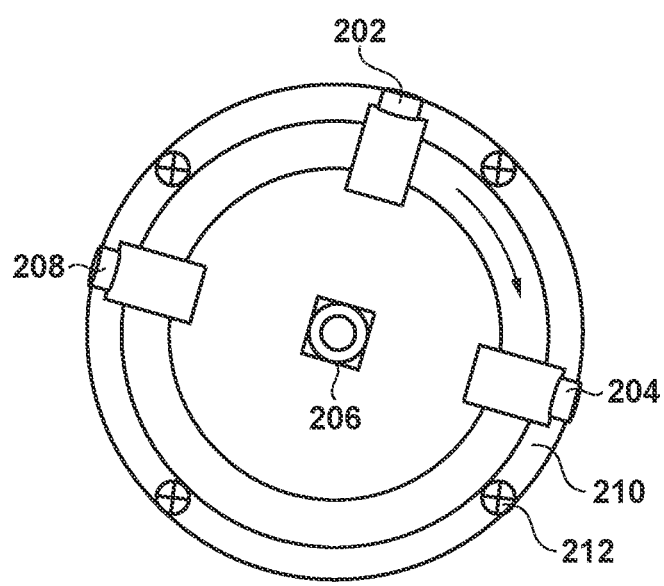
FIG. 7B is a schematic view describing an operation of image capturing units according to the second setting operation.

In order to change the shooting range of the plurality of image capturing units, the user can change the arrangement of the plurality of image capturing units in a clockwise direction with respect to the center of the circle by the second setting operation. The user provides an input to the user interface of the second setting operation to make a change, for example, in a clockwise direction at the same angle while maintaining the relative arrangement of the plurality of image capturing units. Here, FIG. 7B illustrates an arrangement in which the arrangement of the plurality of image capturing units is changed clockwise by the second setting operation. The second setting operation can change the arrangement of the plurality of image capturing units in a clockwise direction (the direction of the arrow) without changing the position of the exterior 210 and the fixing unit 212.

Figure 6D:
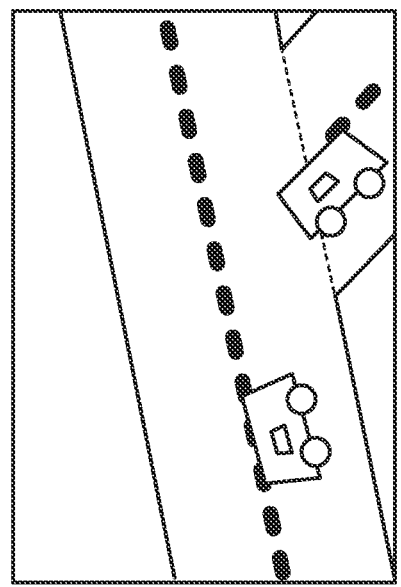
FIG. 6D is a schematic view describing the first setting operation and the second setting operation.

FIG. 6C illustrates the arrangement of the plurality of image capturing units after the second setting operation. Incidentally, the shape of the roads in FIG. 6C and the installation location of the image capturing apparatus 101 are the same as those in FIG. 6A. The arrangement of the plurality of image capturing units compared to before the second setting operation is moved in the clockwise direction as a whole. FIG. 6D is an image in which the image capturing unit 202 has shot the road in the second direction similarly to FIG. 6C and the image is moved clockwise as a whole compared to FIG. 6C. Thus, the image capturing unit 202 can shoot the road of the second direction in the shooting range that the user desires to shoot. According to the present embodiment, it is possible to efficiently change the arrangement of the plurality of image capturing units in the circumferential direction of the image capturing apparatus 101 in the second setting operation in accordance with the shooting range that the user desires to shoot after setting the first setting operation.

Figure 8B:
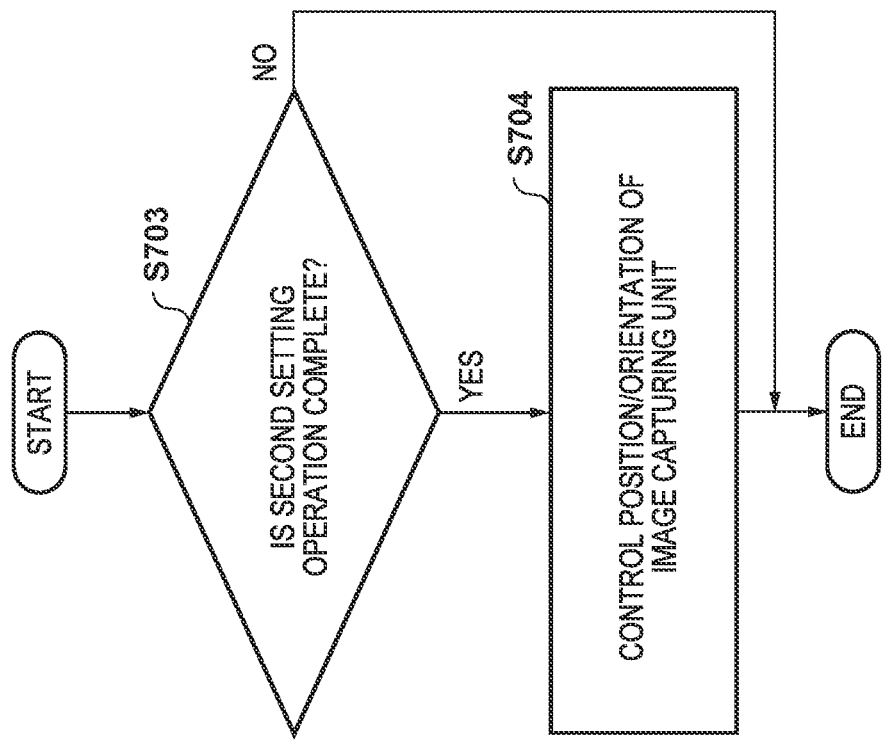
FIG. 8B is a flowchart describing a processing flow of the second setting operation.
Figure 8A:
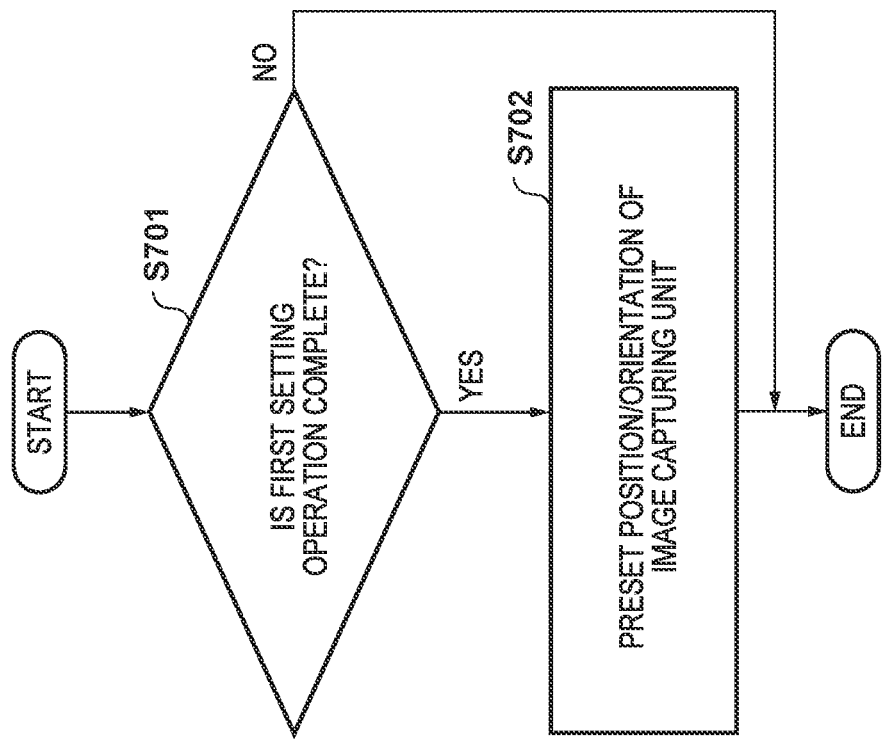
FIG. 8A is a flowchart describing a processing flow of the first setting operation.

FIG. 8A is a flowchart illustrating a processing flow of the first setting operation. This function is realized by the CPU 301 executing a program stored in the ROM 305. In step S701, the setting unit 404 determines whether or not any of the settings of, for example, the 360° shooting mode, the 270° shooting mode, and the line shooting mode has been performed as the first setting operation. If the user has set the first setting operation via the user interface (YES in step S701), the processing proceeds to step S702. If none of the settings of the first setting operation is set (NO in step S701), the processing ends. In step S702, based on the first setting operation inputted in step S701, the setting unit 404 sets the arrangement between the plurality of image capturing units. By the above processing, the first setting operation of the image capturing apparatus 101 is executed.

FIG. 8B is a flowchart illustrating a processing flow of the second setting operation. This function is realized by the CPU 301 executing a program stored in the ROM 305. In step S703, the setting unit 404 determines whether or not the second setting operation has been set. If the user has set the second setting operation via the user interface (YES in step S703), the processing proceeds to step S704. If none of the settings of the second setting operation is set (NO in step S703), the processing ends. In step S704, based on the second setting operation inputted in step S703, while maintaining the relative arrangement between the plurality of image capturing units, the plurality of image capturing units are rotated by the same angle with respect to the common axis or the center in the circle of the image capturing apparatus 101. Thus, it is possible to change the arrangement of the plurality of image capturing units. For the means for changing the shooting range of the plurality of image capturing units, there is a change by the mechanical mechanism and a change by image processing (e.g., clipping processing), and these details will be described later. By the above processing, the second setting operation of the image capturing apparatus 101 is executed.

Figure 9:
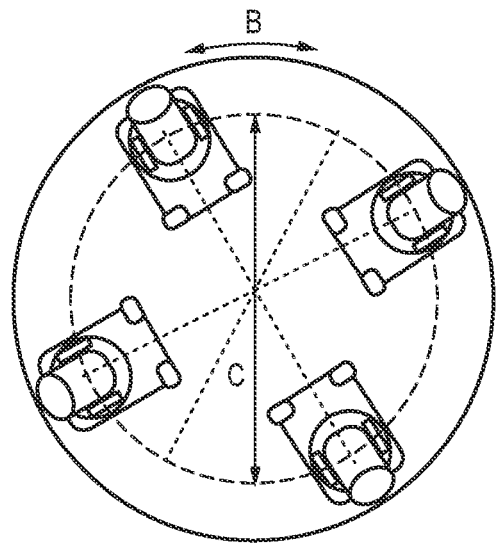
FIG. 9 is a schematic view describing means for change by an operation of a mechanical mechanism.

FIG. 9 is a schematic view for describing the moving direction of each of the plurality of image capturing units by the mechanical mechanism. The mechanical mechanism is one of the means for changing the arrangement between the plurality of image capturing units described in step S704 of FIG. 8. As described in FIG. 2B, the plurality of image capturing units are arranged in the same circle, and each can be moved in a circumferential direction (direction of arrow B) and a diameter direction (direction of arrow C). Further, the plurality of image capturing units can realize the above movement in their respective fixed positions, even as individual image capturing units. Since the plurality of image capturing units can be moved freely within the circle of the image capturing apparatus 101 as described above, it is possible to realize the relative arrangement of the first setting operation. Further, it is possible to realize a change in the arrangement of the plurality of image capturing units in the second setting operation by the mechanical mechanism. By providing the mechanical mechanism, it is possible to realize the arrangement of the plurality of image capturing units in, for example, the 270° shooting mode and the line shooting mode of the first setting operation.

Figure 10:
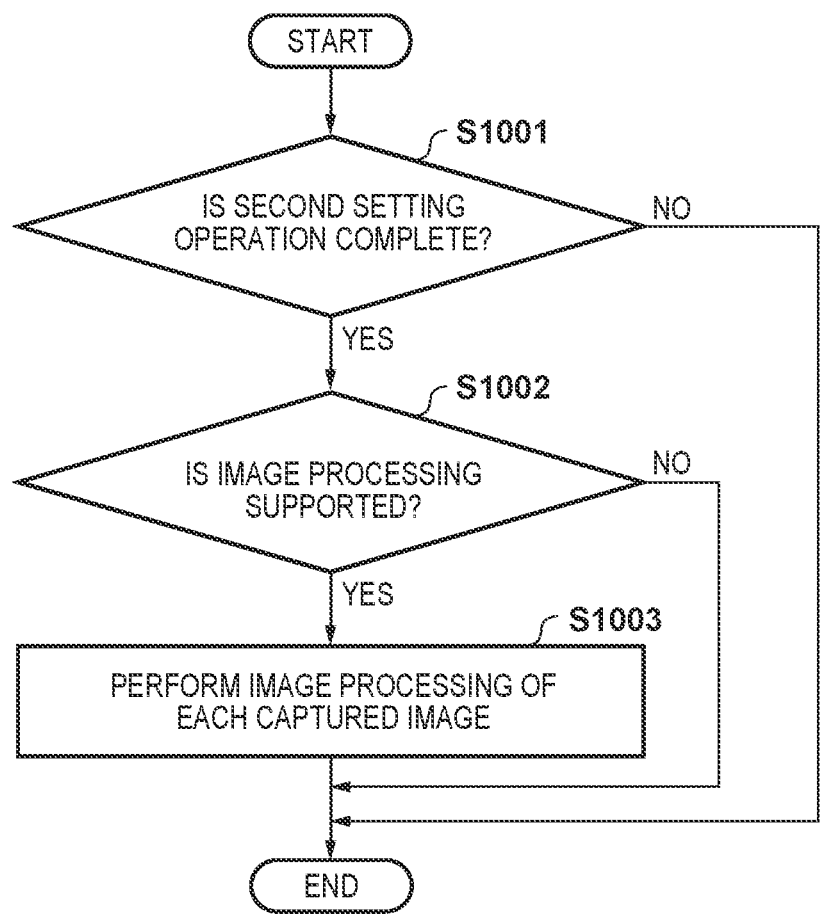
FIG. 10 is a flowchart describing means for change by clipping processing.

On the other hand, instead of changing the arrangement of the plurality of image capturing units, by changing a range to be clipped from an image captured by each image capturing unit, a shooting range of an image corresponding to each image capturing unit may be changed. FIG. 10 is a flowchart describing a method of changing a shooting range by image processing. Image processing in the present embodiment is processing for clipping each image captured by the plurality of image capturing units, and is one of the means for changing the arrangement of the plurality of image capturing units described in step S704 of FIG. 8. If it is possible to realize a shooting range that the user desires to shoot by performing clipping processing on captured images as described above, the processing unit 405 does not need to change the arrangement of the plurality of image capturing units. Such a configuration can be used especially when adjusting the image shooting range in the second setting operation after setting the relative arrangement of the image capturing units using the first setting operation. In step S1001, the setting unit 404 determines whether or not any of the second setting operation has been set. If the user has set the second setting operation via the user interface (YES in step S1001), the processing proceeds to step S1002. If none of the second setting operations is set (NO in step S1001), the processing ends.

In step S1002, the processing unit 405 determines whether or not the clipping process can be performed for each of the images that the plurality of image capturing units have shot. When image data that is larger than the images respectively captured by the image capturing units 308 of the plurality of image capturing units has been acquired (YES in step S1002), the processing unit 405 can perform clipping processing. When clipping processing needs to be performed on regions other than the captured images (NO in step S1002), the processing unit 405 changes the arrangement of the plurality of image capturing units by the mechanical mechanism. In step S1003, the processing unit 405 performs clipping processing on each of the captured images that the plurality of image capturing units have captured. The size of a clipping portion in the clipping processing may be a preset size, or may vary depending on the shooting condition, such as the focal length at the time of shooting, recorded in the image. According to the present embodiment, by performing clipping processing on each of the captured images of the plurality of image capturing units, it is possible to realize the shooting range that the user desires to shoot.

Figure 11:
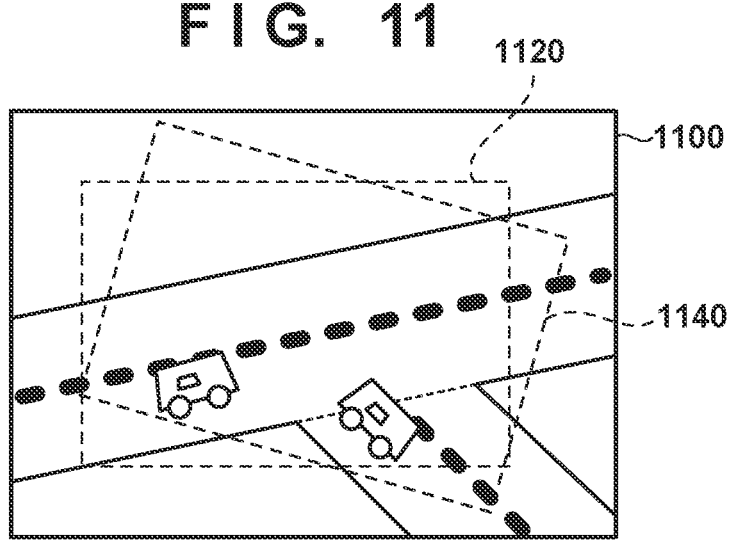
FIG. 11 is a schematic view describing the clipping processing.

FIG. 11 is a schematic view describing a specific example of the clipping processing. A whole image 1100 and an image 1120 are images that any of the plurality of image capturing units has captured. An image 1140 is an image after the processing of clipping from the whole image 1100 by the processing unit 405. The processing of the processing unit 405 when the acquisition unit 402 has acquired the whole image 1100, which is larger than the image captured by any of the image capturing unit 308 of the plurality of image capturing units will be described. The processing unit 405 can perform processing of clipping from the whole image 1100 based on, for example, an instruction to change the shooting direction by the user to acquire the image 1140. Note that the image 1120 is the same as the captured image of FIG. 6B, and the image 1140 after the clipping processing is the same as FIG. 6D. Thus, if the plurality of image capturing units have captured a whole image that is larger than the captured image and there is an instruction to change the shooting direction, the processing unit 405 can perform the clipping processing.

Figure 12:
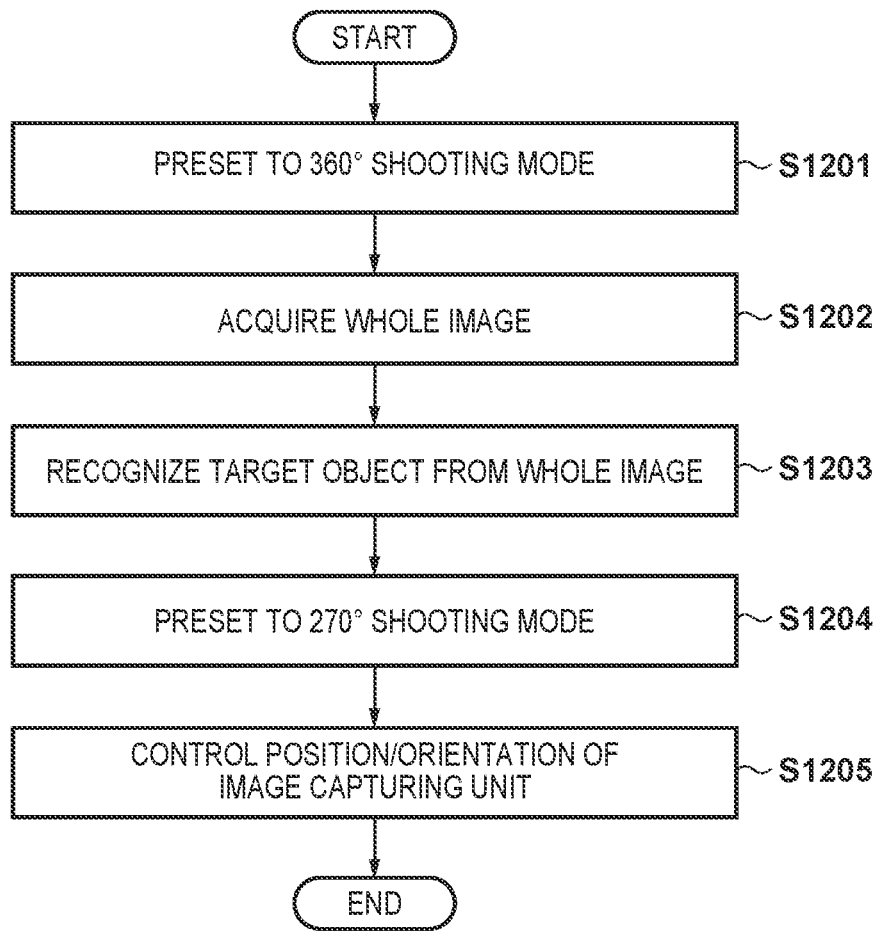
FIG. 12 is a flowchart describing that positions and orientations of a plurality of image capturing units are automatically adjusted based on target recognition.

FIG. 12 is a flowchart describing that the second setting operation of the plurality of image capturing units are automatically performed based on object recognition. As an example of an embodiment, if the image capturing apparatus 101 is installed on an inner side of a bend in a three-way intersection, for example, the recognition unit 403 can recognize from the bend the first direction and the second direction of the road extending from the bend.

In step S1201, the setting unit 404 executes the 360° shooting mode in the first setting operation to acquire a whole image. The plurality of image capturing units is set in an arrangement corresponding to the 360° shooting mode. In step S1202, the acquisition unit 402 acquires a whole image in which the captured images that the plurality of image capturing units have captured have been combined. Note that the captured image used when acquiring a whole image may be a part of the above. In step S1203, the recognition unit 403, by a pattern matching method, can automatically recognize, for example, a three-way intersection as a target from the whole image. In step S1204, the setting unit 404 executes the 270° shooting mode in the first setting operation in order to perform shooting of the road in the first direction and the second direction of the three-way intersection. Incidentally, the setting unit 404, in accordance with, for example, the number of targets, the direction of targets, and the like that the recognition unit 403 recognizes, can set an optimal shooting mode of the first setting operation.

In step S1205, the setting unit 404 changes the arrangement of the plurality of image capturing units. At this time, the setting unit 404 can change the arrangement such that the direction from the image capturing apparatus 101 toward the center of a range of image shooting using the plurality of image capturing units coincides with the direction from the image capturing apparatus 101 toward the direction in the center of the shooting target in the vicinity of the image capturing apparatus 101. In this example, the shooting target is a road. In particular, in the example of FIG. 6A, the direction to the center of the imaging target is a direction 601 toward the central region between the two roads extending from the position of the image capturing apparatus 101. Therefore, as illustrated in FIG. 6C, the arrangement of the plurality of image capturing units is changed while maintaining the relative arrangement such that the direction toward the center of a range of image shooting using the plurality of image capturing units (direction of the image capturing unit 202 in this example) is oriented to the direction 601 toward the central region.

The acquisition unit 402 refers to the position and orientation of each of the plurality of image capturing units that the position/orientation recognition unit 313 acquires in step S1203 in order to perform such an operation. Based on the above references, the acquisition unit 402 can acquire the absolute position (position in space) of the road from the position in the images of the road that the recognition unit 403 recognized in step S1203. Further, the acquisition unit 402 can acquire the positions and orientations of the plurality of image capturing units set in step S1204 via the position/orientation recognition unit 313. Thus, the setting unit 404, based on the absolute position of the road and the positions and orientations of the plurality of image capturing units, can automatically perform the second setting operation such that the road is included in the shooting range of the plurality of image capturing units.

As another example, it is assumed that the position and orientation of the image capturing unit 202 is associated when acquiring the absolute position of the road in the second direction illustrated in FIG. 6A, for example. In this case, the setting unit 404 can change the arrangement of the plurality of image capturing units until the image shooting range of the image capturing unit 202 includes the absolute position of the road in the second direction. Incidentally, there may be a plurality of image capturing units associated with the absolute position of the road, and the user may decide which range in the image shooting range of the associated image capturing unit to include the absolute position of the road. By the user setting these pieces of information in the setting unit 404 in advance, the arrangement of the plurality of image capturing units may be changed. According to the present embodiment, it is possible to change the arrangement of the plurality of image capturing units so as to shoot a particular shooting range of the entire circumference of the image capturing apparatus 101 in accordance with the recognized target (including the bend).

Figure 13:
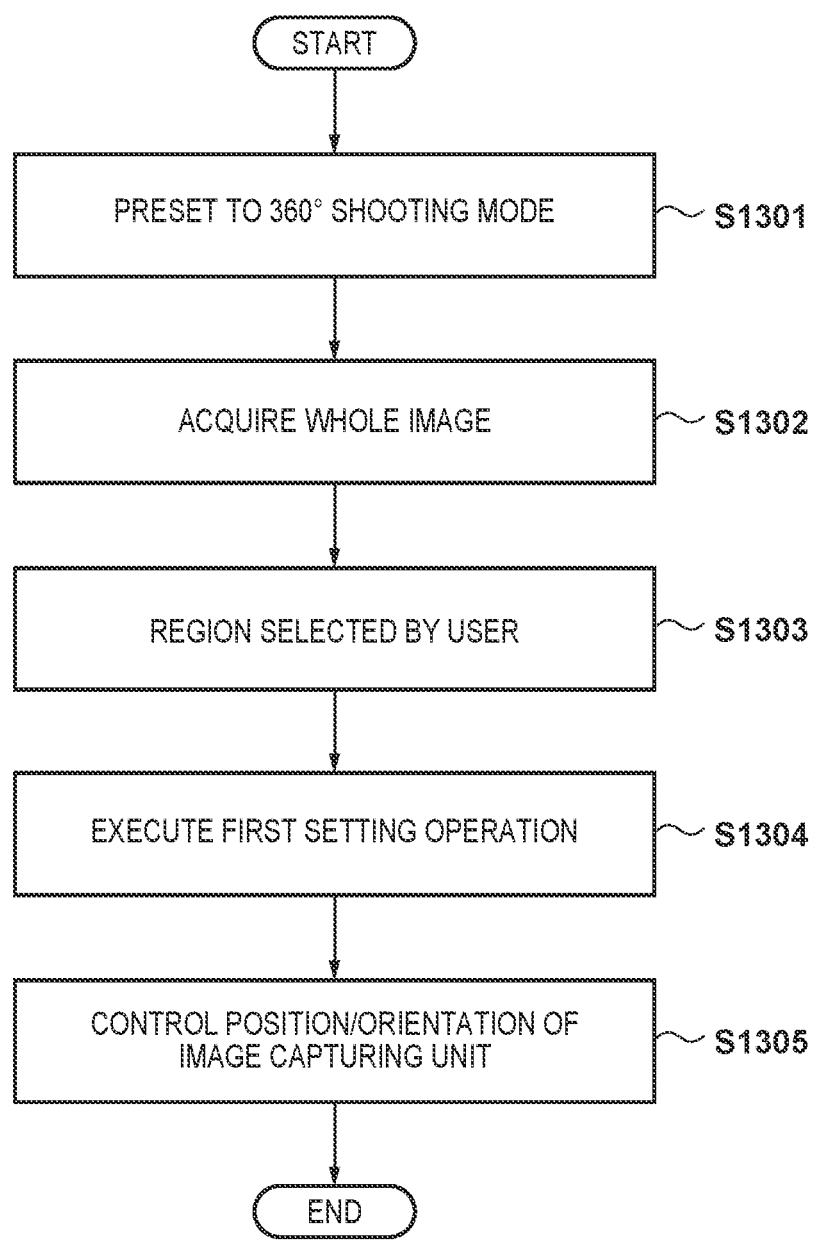
FIG. 13 is a flowchart describing that positions and orientations of a plurality of image capturing units are automatically adjusted based on a region selected by a user.

FIG. 13 is a flowchart describing that the arrangement of the plurality of image capturing units is automatically changed based on a region selected by a user on a captured image. The selected region refers to a region that the user selected from captured images that the plurality of image capturing units have captured or a whole image in which these captured images are combined. The present embodiment is used when the image capturing apparatus 101 is installed in a large location such as a parking lot.

In step S1301, the setting unit 404 executes the 360° shooting mode in the first setting operation to acquire a whole image. The plurality of image capturing units is set in an arrangement corresponding to the 360° shooting mode. In step S1302, the acquisition unit 402 acquires a whole image in which the captured images that the plurality of image capturing units have respectively captured have been combined. In step S1303, the user selects, for example, a plurality of vehicles arranged in a straight line or the like as a region selected from the whole image. At this time, the user may select a target with a symbol such as a circle, a square, or the like that can cover the target.

In step S1304, the setting unit 404 performs a multi-lens preset function. Here, the setting unit 404 can select a multi-lens preset covering the region of interest that the user has selected in step S1303. For example, when the region of interest is straight, the setting unit 404 may select the line shooting mode as the first setting operation. As a specific example, the setting unit 404 may select a line shooting mode when it is determined that a plurality of selected regions selected by the user and the image capturing apparatus 101 are arranged in a straight line. On the other hand, the setting unit 404, when the region of interest is radial, the setting unit 404 can select the 270° shooting mode or 360° shooting mode as the first setting operation. As a specific example, the setting unit 404 may set the following shooting mode when it is determined that a plurality of selected regions selected by the user are radially arranged about the image capturing apparatus 101. For example, the setting unit 404 may respectively select the 270° shooting mode when the selected region extends over a narrower range, or the 360° shooting mode when the selected region extends over a wider range.

In step S1305, the acquisition unit 402 can acquire the absolute position of the selected region selected in step S1303 based on the respective positions and orientations of the plurality of image capturing units that the position/orientation recognition unit 313 has acquired by the point in time of step S1303. Further, the acquisition unit 402 can acquire the positions and orientations of the plurality of image capturing units set in step S1304 via the position/orientation recognition unit 313. The setting unit 404, based on the absolute position of the selected region and the positions and orientations of the plurality of image capturing units, can set by the second setting operation the arrangement of the plurality of image capturing units such that the selected region is included in the shooting range of the plurality of corresponding image capturing units. According to the present embodiment, it is possible to automatically set the arrangement of a plurality of image capturing units in accordance with a target present in a selection region of the user included in a whole image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-179981, filed Oct. 27, 2020 which is hereby incorporated by reference herein in its entirety.

What is claimed is:

1. An image capturing control apparatus comprising:
a setting unit configured to set an arrangement of a plurality of image capturing units, wherein the setting unit performs:
a first setting operation of deciding a relative arrangement of the plurality of image capturing units in accordance with a setting selected from a plurality of settings respectively defining relative arrangements between the plurality of image capturing units; and
a second setting operation of deciding the arrangement of the plurality of image capturing units by rotating the plurality of image capturing units while maintaining the relative arrangement between the plurality of image capturing units decided by the first setting operation; and
a control unit configured to control the arrangement of the plurality of image capturing units in accordance with a setting by the setting unit.

2. The image capturing control apparatus according to claim 1, wherein
at least one setting of the plurality of settings defines:
a relative arrangement between the plurality of image capturing units capable of shooting an entire circumference of the image capturing apparatus,
a relative arrangement between the plurality of image capturing units capable of shooting only a portion of the entire circumference of the image capturing apparatus and directly below the image capturing apparatus, or
a relative arrangement between the plurality of image capturing units in which vectors of respective image capturing directions of the plurality of image capturing units whose origin is the image capturing apparatus are in the same plane.

3. The image capturing control apparatus according to claim 1, wherein, in the second setting operation, the arrangement of the plurality of image capturing units is changed such that the plurality of image capturing units are rotated by the same angle with respect to a common axis.

4. The image capturing control apparatus according to claim 1, wherein the plurality of image capturing units are arranged in the same circle, and each image capturing unit can be moved in a circumferential direction and a diameter direction.

5. The image capturing control apparatus according to claim 4, wherein
at least one setting of the plurality of settings defines:
a relative arrangement between the plurality of image capturing units in which all of the plurality of image capturing units are positioned on a circumference of the circle,
a relative arrangement between the plurality of image capturing units in which one of the plurality of image capturing units is positioned at a center of the circle and the rest are positioned on the circumference of the circle, or
a relative arrangement between the plurality of image capturing units in which all of the plurality of image capturing units are positioned on the same diameter of the circle.

6. The image capturing control apparatus according to claim 4, wherein, in the second setting operation, the arrangement of the plurality of image capturing units is changed such that the plurality of image capturing units are rotated by the same angle with respect to the center of the circle.

7. The image capturing control apparatus according to claim 1, further comprising:
a provision unit configured to provide a user interface including
a first setting unit for accepting a selection from a plurality of settings for the first setting operation, and
a second setting unit for accepting an instruction to change the arrangement of the plurality of image capturing units for the second setting operation.

8. The image capturing control apparatus according to claim 1, further comprising a position recognition unit configured to recognize a position and an orientation of each of the plurality of image capturing units.

9. The image capturing control apparatus according to claim 1, further comprising:
an object recognition unit configured to perform object recognition processing on an image that the plurality of image capturing units have captured,
wherein the setting unit sets the arrangement of the plurality of image capturing units based on a result of the object recognition processing.

10. The image capturing control apparatus according to claim 9, wherein the setting unit sets the arrangement of the plurality of image capturing units such that an object recognized in the object recognition processing is included in an image shooting range.

11. The image capturing control apparatus according to claim 9, wherein the setting unit sets the arrangement of the plurality of image capturing units such that a direction from the image capturing apparatus toward a center of an image shooting range using the plurality of image capturing units coincides with a direction from the image capturing apparatus toward a direction in a center of a shooting target recognized in the object recognition processing.

12. The image capturing control apparatus according to claim 1, wherein the setting unit sets the arrangement of the plurality of image capturing units such that an object that is present in a selected region selected by a user in a captured image that the plurality of image capturing units have captured is included in an image shooting range.

13. The image capturing control apparatus according to claim 12, wherein the setting unit performs a first setting operation in accordance with a selected region selected by a user in a captured image that the plurality of image capturing units have captured.

14. The image capturing control apparatus according to claim 13, wherein the setting unit, in response to a determination that a plurality of selected regions selected by the user and a position of the image capturing apparatus are arranged in a straight line, selects a relative arrangement between the plurality of image capturing units in which vectors of respective image capturing directions of the plurality of image capturing units whose origin is the image capturing apparatus are in the same plane.

15. The image capturing control apparatus according to claim 1, further comprising:
a processing unit configured to perform clipping processing on each image captured by the plurality of image capturing units, wherein
the processing unit changes a clipping location in the clipping processing in accordance with an instruction to change an image capturing direction of an image corresponding to each of the plurality of image capturing units.

16. The image capturing control apparatus according to claim 1, wherein the image capturing control apparatus is provided in the image capturing apparatus.

17. The image capturing control apparatus according to claim 1, wherein the image capturing control apparatus is provided in an information processing apparatus that the image capturing apparatus communicates with.

18. An image capturing control method comprising:
setting an arrangement of a plurality of image capturing units, wherein the setting includes:
a first setting operation of deciding a relative arrangement of the plurality of image capturing units in accordance with a setting selected from a plurality of settings respectively defining relative arrangement between the plurality of image capturing units; and
a second setting operation of deciding the arrangement of the plurality of image capturing units by rotating the plurality of image capturing units while maintaining the relative arrangement between the plurality of image capturing units decided by the first setting operation; and
controlling the arrangement of the plurality of image capturing units in accordance with a setting by the setting.

19. A non-transitory computer-readable storage medium storing a program that, when executed by a computer, causes the computer to perform a method comprising:
setting an arrangement of a plurality of image capturing units, wherein the setting includes:
a first setting operation of deciding a relative arrangement of the plurality of image capturing units in accordance with a setting selected from a plurality of settings respectively defining the relative arrangement between the plurality of image capturing units; and
a second setting operation of deciding the arrangement of the plurality of image capturing units by rotating the plurality of image capturing units while maintaining the relative arrangement between the plurality of image capturing units decided by the first setting operation; and
a controlling the arrangement of the plurality of image capturing units in accordance with a setting by the setting.

* * * * *